(12) United States Patent
Osaku et al.

(10) Patent No.: US 10,442,169 B2
(45) Date of Patent: Oct. 15, 2019

(54) LAMINATED BODY, CONDUCTIVE ROLLER, AND METHOD FOR MANUFACTURING LAMINATED BODY

(71) Applicant: BRIDGESTONE CORPORATION, Tokyo (JP)

(72) Inventors: Akihide Osaku, Kawasaki (JP); Yusuke Kamijo, Saitama (JP); Takehiro Sano, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/321,781

(22) PCT Filed: Jun. 26, 2015

(86) PCT No.: PCT/JP2015/003226
§ 371 (c)(1),
(2) Date: Dec. 23, 2016

(87) PCT Pub. No.: WO2016/002181
PCT Pub. Date: Jan. 7, 2016

(65) Prior Publication Data
US 2017/0136750 A1 May 18, 2017

(30) Foreign Application Priority Data
Jun. 30, 2014 (JP) .................. 2014-134841

(51) Int. Cl.
*B32B 27/40* (2006.01)
*B05D 7/02* (2006.01)
(Continued)

(52) U.S. Cl.
CPC .............. *B32B 27/40* (2013.01); *B05D 3/067* (2013.01); *B05D 7/02* (2013.01); *B05D 7/26* (2013.01);
(Continued)

(58) Field of Classification Search
CPC ...... C08G 18/672; C08G 18/42; C08G 18/48; C08G 18/62; C08G 18/4018;
(Continued)

(56) References Cited

U.S. PATENT DOCUMENTS 4,337,296 A * 6/1982 Varadhachary ......... B32B 27/08
428/420
4,634,602 A * 1/1987 Sirkoch .................... C09D 4/06
427/507

(Continued)

FOREIGN PATENT DOCUMENTS

CN 101427188 A 5/2009
CN 102673211 A 9/2012
(Continued)

OTHER PUBLICATIONS

International Search Report of PCT/JP2015/003226 dated Sep. 29, 2015 [PCT/ISA/210].
(Continued)

*Primary Examiner* — Thao T Tran
(74) *Attorney, Agent, or Firm* — Sughrue Mion, PLLC (57) ABSTRACT

Provided are a laminated body that can improve the adhesive force between the base layer and the surface layer, a conductive roller provided with the laminated body, and a method for manufacturing a laminated body with improved adhesive force between the base layer and the surface layer. The disclosed laminated body includes a base layer and a surface layer formed on the base layer, the base layer includes polyurethane having a (meth)acryloyl group, the surface layer includes a radical curable resin obtained by polymerizing (meth)acrylate that has a (meth)acryloyl group, and the laminated body is formed by the (meth)acryloyl group in the polyurethane reacting with the (meth)acryloyl group in the (meth)acrylate.

8 Claims, 1 Drawing Sheet

(51) Int. Cl.

| | | |
|---|---|---|
| B05D 7/26 | (2006.01) | |
| B05D 3/06 | (2006.01) | |
| F16C 13/00 | (2006.01) | |
| G03G 15/02 | (2006.01) | |
| G03G 15/08 | (2006.01) | |
| B32B 7/04 | (2019.01) | |
| B32B 27/30 | (2006.01) | |
| C08G 18/67 | (2006.01) | |
| C08J 7/04 | (2006.01) | |
| C08F 290/06 | (2006.01) | |
| C08F 299/06 | (2006.01) | |
| G03G 15/00 | (2006.01) | |
| B32B 7/10 | (2006.01) | |
| B32B 27/08 | (2006.01) | |
| C08G 18/48 | (2006.01) | |
| C08G 18/69 | (2006.01) | |
| C08G 18/75 | (2006.01) | |
| C08G 18/79 | (2006.01) | |
| C08G 18/81 | (2006.01) | |
| C09D 175/16 | (2006.01) | |
| C08G 18/40 | (2006.01) | |
| C08G 18/42 | (2006.01) | |

(52) U.S. Cl.
CPC ............... *B32B 7/04* (2013.01); *B32B 7/10* (2013.01); *B32B 27/08* (2013.01); *B32B 27/30* (2013.01); *C08F 290/06* (2013.01); *C08F 299/06* (2013.01); *C08G 18/4018* (2013.01); *C08G 18/4202* (2013.01); *C08G 18/4241* (2013.01); *C08G 18/4829* (2013.01); *C08G 18/67* (2013.01); *C08G 18/672* (2013.01); *C08G 18/69* (2013.01); *C08G 18/755* (2013.01); *C08G 18/792* (2013.01); *C08G 18/8116* (2013.01); *C08J 7/04* (2013.01); *C09D 175/16* (2013.01); *F16C 13/00* (2013.01); *G03G 15/00* (2013.01); *G03G 15/0233* (2013.01); *G03G 15/0808* (2013.01); *B32B 2255/10* (2013.01); *B32B 2255/26* (2013.01); *B32B 2307/748* (2013.01); *B32B 2457/00* (2013.01)

(58) Field of Classification Search
CPC ............ C08G 18/4202; C08G 18/4241; C08G 18/4829; C08G 18/67; C08G 18/755; C08G 18/792; C08G 18/8116; B05D 3/067; B05D 7/02; B05D 7/26; B32B 2255/10; B32B 2255/26; B32B 2307/748; B32B 2457/00; B32B 27/30; B32B 27/40; B32B 7/04; B32B 7/10; C08F 290/06; C08F 299/06; C08J 7/04; C09D 175/16; F16C 13/00; G03G 15/00; G03G 15/0233; G03G 15/0808
USPC .......... 428/423.3; 430/60; 399/176; 528/65
See application file for complete search history.

(56) References Cited

U.S. PATENT DOCUMENTS

| | | | | |
|---|---|---|---|---|
| 5,674,623 | A * | 10/1997 | Haddon | ............... C09J 167/07 428/414 |
| 2002/0198314 | A1* | 12/2002 | Meisenburg | ......... C08G 18/672 524/589 |
| 2004/0234743 | A1 | 11/2004 | Wissing et al. | |
| 2006/0173122 | A1* | 8/2006 | Flosbach | ............ C08G 18/3206 524/507 |
| 2007/0197362 | A1* | 8/2007 | Sakata | ............... G03G 15/0233 492/49 |
| 2008/0292366 | A1* | 11/2008 | Akama | ............... G03G 15/0818 399/286 |
| 2009/0010690 | A1 | 1/2009 | Kanesugi et al. | |
| 2010/0189473 | A1 | 7/2010 | Sugimura et al. | |
| 2013/0302070 | A1 | 11/2013 | Oosaku et al. | |

FOREIGN PATENT DOCUMENTS

| | | |
|---|---|---|
| CN | 103339571 A | 10/2013 |
| JP | 2000-229394 A | 8/2000 |
| JP | 2008-106840 A | 5/2008 |
| JP | 2009-025419 A | 2/2009 |
| JP | 2012-252215 A | 12/2012 |
| JP | 2014-141086 A | 8/2014 |

OTHER PUBLICATIONS

Communication dated Jan. 10, 2018, from State Intellectual Property Office of the P.R.C. in counterpart application No. 201580033848.7.

* cited by examiner

LAMINATED BODY, CONDUCTIVE ROLLER, AND METHOD FOR MANUFACTURING LAMINATED BODY

CROSS REFERENCE TO RELATED APPLICATIONS

This application is a National Stage of International Application No. PCT/JP2015/003226, filed Jun. 26, 2015, claiming priority based on Japanese Patent Application No. 2014-134841, filed Jun. 30, 2014, the contents of all of which are incorporated herein by reference in their entirety.

TECHNICAL FIELD

This disclosure relates to a laminated body, a conductive roller, and a method for manufacturing a laminated body.

BACKGROUND

In a conductive roller having an elastic layer that includes polyurethane, in order to suppress toner filming and the like, a technique to provide ultraviolet curable resin as a surface layer on a base layer is known (for example, see JP 2009-25419 A (PTL 1)).

As a method for adhering the base layer and the surface layer, one known technique incorporates a component having a polar group, such as a carboxyl group or a hydroxyl group, in the base layer.

CITATION LIST

Patent Literature

PTL 1: JP 2009-25419 A

SUMMARY

Technical Problem

The aforementioned technique, however, mainly has the following three problems. The first problem is that the base layer and the surface layer are adhered by interaction of the polar group, but since the adhesive force between the base layer and the surface layer is weak, sufficient adhesion durability might not be obtained when applying the technique to parts in which friction occurs (an OA roller or the like). The second problem is that since a component that has a polar group, such as a carboxyl group or a hydroxyl group, is used in the base layer formation, bleeding of unreacted material may occur. The third problem is that the required physical properties, such as the water-vapor permeability and the electrical resistance of the conductive roller, might change by using a component that has a polar group, such as a carboxyl group or a hydroxyl group, in the base layer formation.

Therefore, it would be helpful to provide a laminated body with improved adhesive force between the base layer and the surface layer, a conductive roller with improved adhesion durability, and a method for manufacturing a laminated body that can obtain a laminated body with improved adhesive force between the base layer and the surface layer.

Solution to Problem

A laminated body according to this disclosure is a laminated body including a base layer and a surface layer formed on the base layer; such that the base layer includes polyurethane having a (meth)acryloyl group; the surface layer includes a radical curable resin obtained by polymerizing (meth)acrylate that has a (meth)acryloyl group; and the laminated body is formed by the (meth)acryloyl group in the polyurethane reacting with the (meth)acryloyl group in the (meth)acrylate.

The laminated body according to this disclosure can improve the adhesive force between the base layer and the surface layer.

In this disclosure, the "(meth)acrylate" refers to at least one of acrylate and methacrylate.

In this disclosure, the "(meth)acryloyl" refers to at least one of acryloyl and methacryloyl, and the "(meth)acryloyl group" refers to at least one of an acryloyl group ($CH_2$=CHCO—) and a methacryloyl group ($CH_2$=C($CH_3$)CO—).

In the laminated body according to this disclosure, the (meth)acryloyl group in the polyurethane is preferably derived from (meth)acrylate having a hydroxyl group and a (meth)acryloyl group in one molecule. The laminated body according to this disclosure can thus further improve the adhesive force between the base layer and the surface layer.

In the laminated body according to this disclosure, the (meth)acryloyl group in the polyurethane is preferably derived from (meth)acrylate having an isocyanate group and a (meth)acryloyl group in one molecule. The laminated body according to this disclosure can thus further improve the adhesive force between the base layer and the surface layer.

In the laminated body according to this disclosure, the polyurethane is preferably obtained by reacting polyol, isocyanate, and (meth)acrylate, and the compounding amount of the (meth)acrylate is preferably from 2 parts by mass to 6 parts by mass relative to a total of 100 parts by mass of the polyol and the isocyanate. The laminated body according to this disclosure can thus further improve the adhesive force between the base layer and the surface layer.

In the laminated body according to this disclosure, the radical curable resin is preferably an energy ray curable resin. The laminated body according to this disclosure can thus even further improve the adhesive force between the base layer and the surface layer.

In the laminated body according to this disclosure, the energy ray curable resin is preferably ultraviolet curable resin. The laminated body according to this disclosure can thus particularly improve the adhesive force between the base layer and the surface layer.

A conductive roller according to this disclosure includes the laminated body according to this disclosure. The conductive roller according to this disclosure can improve the adhesive force between the base layer and the surface layer.

A method for manufacturing a laminated body according to this disclosure includes: forming a base layer including polyurethane having a (meth)acryloyl group; applying a composition including (meth)acrylate onto the base layer that was formed; and irradiating the applied composition with ultraviolet light to form a surface layer that includes a polymer of the (meth)acrylate and to react the (meth)acryloyl group in the (meth)acrylate with the (meth)acryloyl group in the polyurethane.

With the method for manufacturing according to this disclosure, a laminated body with improved adhesive force between the surface layer and the base layer can be obtained by chemically reacting the (meth)acryloyl group in the surface layer with the (meth)acryloyl group in the base layer.

Advantageous Effect

According to this disclosure, a laminated body with improved adhesive force between the base layer and the surface layer, a conductive roller including a laminated body with improved adhesive force between the base layer and the surface layer, and a method for manufacturing a laminated body with improved adhesive force between the base layer and the surface layer can be provided.

DETAILED DESCRIPTION

The following describes embodiments for implementing this disclosure.

(Laminated Body)

A laminated body according to this disclosure includes at least a base layer and a surface layer formed on the base layer. The laminated body also includes other layers as necessary.

Figure 1:
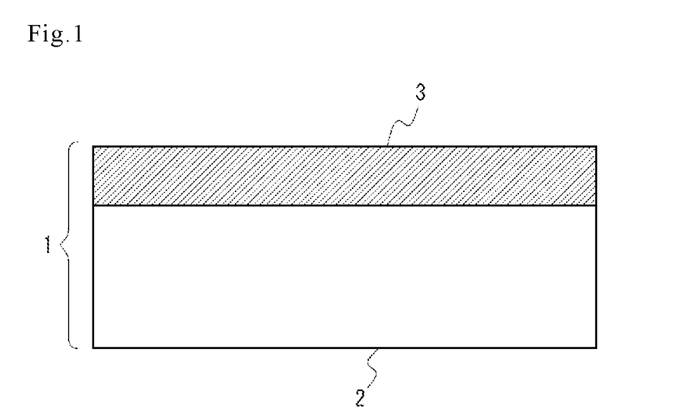
FIG. 1 is a cross-sectional diagram of an example of a laminated body according to this disclosure.

FIG. 1 is a cross-sectional diagram of an example of a laminated body according to this disclosure. The laminated body in FIG. 1 includes a base layer 2 and a surface layer 3 formed on the base layer 2. The laminated body 1 illustrated in FIG. 1 includes only one base layer 2, but two or more base layers may be included. Also, the laminated body 1 illustrated in FIG. 1 includes only one surface layer 3, but two or more surface layers may be included.

<Base Layer>

The base layer at least includes polyurethane having a (meth)acryloyl group and also includes other components as necessary.

<<Polyurethane Having a (Meth)Acryloyl Group>>

The polyurethane having a (meth)acryloyl group is obtained by reacting (meth)acrylate, polyol, isocyanate, and as necessary, a catalyst or the like. During preparation of the polyurethane, a foam stabilizer may be used.

—(Meth)Acrylate—

The (meth)acrylate is not restricted and may be selected according to the intended purpose, as long as one or more (meth)acryloyl groups are included in one molecule. The (meth)acrylate may be (meth)acrylate having a hydroxyl group and a (meth)acryloyl group in one molecule, or may be (meth)acrylate having an isocyanate group and a (meth) acryloyl group in one molecule.

—(Meth)Acrylate Having a Hydroxyl Group and a (Meth)Acryloyl Group in One Molecule—

The (meth)acrylate having a hydroxyl group and a (meth) acryloyl group in one molecule is not restricted and may be selected according to the intended purpose. Examples include 2-hydroxyethyl acrylate, 2-hydroxypropyl acrylate, 2-hydroxyethyl methacrylate, 4-hydroxybutyl acrylate, pentaerythritol acrylate, pentaerythritol tetraacrylate, isocyanuric acid EO modified diacrylate, dipentaerythritol pentacrylate, dipentaerythritol hexaacrylate, 1,4-cyclohexane dimethanol monoacrylate, an adduct of bisphenol A diglycidyl ether acrylic acid, hydroxyethyl acrylamide, 2-hydroxy-3-acryloylxypropyl methacrylate, and the like. One type of these may be used alone, or a combination of two or more types may be used.

Among these, 2-hydroxyethyl acrylate is preferable in terms of cost and of expressing adhesive force with high reactivity.

—(Meth)Acrylate Having an Isocyanate Group and a (Meth)Acryloyl Group in One Molecule—

The (meth)acrylate having an isocyanate group and a (meth)acryloyl group in one molecule is not restricted and may be selected according to the intended purpose. Examples include 2-isocyanatoethyl acrylate, 2-isocyanatoethyl methacrylate, 1,1-(bisacryloyl oxymethyl)ethyl isocyanate, and the like. One type of these may be used alone, or a combination of two or more types may be used.

Among these, 2-isocyanatoethyl acrylate is preferable because of having good urethane reaction activity and acrylate reaction activity, and due to expressing high adhesiveness.

—Polyol—

The polyol is not restricted and may be selected according to the intended purpose, as long as the polyol is a compound having a plurality of hydroxyl groups (OH groups). Examples include polyether polyol, polyester polyol, polytetramethylene glycol, polybutadiene polyol, alkylene oxide-modified polybutadiene polyol, polyisoprene polyol, or the like. One type of these may be used alone, or a combination of two or more types may be used.

Among these, hydrogenated polybutadiene polyol is preferable because of having resistance to water vapor transmittance and little environmental variation in resistance.

—Isocyanate—

The isocyanate is not restricted and may be selected according to the intended purpose, as long as the isocyanate has an isocyanate group. Examples include tolylene diisocyanate (TDI), prepolymerized tolylene diisocyanate (prepolymerized TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate, and hexamethylene diisocyanate (HDI); and isocyanurate-modified products, carbodiimide-modified products, glycol-modified products, and the like thereof. One type of these may be used alone, or a combination of two or more types may be used.

Among these, prepolymerized tolylene diisocyanate is preferable for reasons such as having good urethane reaction activity and for making it easy to guarantee flexibility of the base material.

—Catalyst—

The catalyst is not restricted and may be selected according to the intended purpose. Examples include dibutyltin dilaurate, dioctyltin acetate, dioctyltin bis(ethylmalate), dibutyltin (oleylmalate), dibutyltin diacetate, dibutyltin thiocarboxylate, dibutyltin dimaleate, dioctyltin thiocarboxylate, tin octoate, monobutyltin oxide, and the like. One type of these may be used alone, or a combination of two or more types may be used.

Among these, dibutyltin dilaurate is preferable because of having high catalytic activity.

—Foam Stabilizer—

The foam stabilizer is not restricted and may be selected according to the intended purpose. Examples include a silicone-based foam stabilizer, an ionic surfactant, a non-ionic surfactant, and the like. One type of these may be used alone, or a combination of two or more types may be used.

Among these, a silicone-based foam stabilizer is preferable because of the foam being highly uniform.

—Compounding Amount of (Meth)Acrylate—

The compounding amount of the (meth)acrylate relative to a total of 100 parts by mass of the polyol and the isocyanate in parts by mass is not restricted and may be appropriately selected according to the intended purpose, but the compounding amount is preferably from 2 parts by mass to 20 parts by mass, more preferably from 2 parts by mass to 10 parts by mass, and particularly preferably from 2 parts by mass to 6 parts by mass.

If the compounding amount of the (meth)acrylate is less than 2 parts by mass, the adhesive force between the base layer and the surface layer may not be significant, whereas if the compounding amount exceeds 20 parts by mass, the hardness of the surface layer becomes too low, possibly causing insufficient hardness. On the other hand, setting the compounding amount of the (meth)acrylate to be within the above preferable range, the above more preferable range, or the above particularly preferable range is advantageous in terms of adhesive force and few unhardened impurities in the base material.

<<Other Components>>

Other components included as necessary in the base layer are not restricted and may be appropriately selected according to the intended purpose. Examples include a foam stabilizer, ion conductive agent, filler, peptizer, foaming agent, plasticizer, softener, tackifier, anti-blocking agent, separating agent, mold release agent, extender, colorant, crosslinking agent, vulcanizing agent, polymerization initiator, polymerization inhibitor, and the like. One type of these may be used alone, or a combination of two or more types may be used.

<Surface Layer>

The laminated body of this disclosure includes a surface layer formed on the base layer.

The surface layer includes at least a radical curable resin and also includes other components as necessary.

<<Radical Curable Resin>>

The radical curable resin is not restricted and may be selected according to the intended purpose, as long as the radical curable resin is obtained by polymerizing (meth) acrylate that has a (meth)acryloyl group. Examples include an energy ray curable resin, thermal radical curable resin, and the like. One type of these may be used alone, or a combination of two or more types may be used.

Among these, an energy ray curable resin is preferable because of its reaction speed and energy efficiency.

—(Meth)Acrylate Used in Surface Layer Formation—

The (meth)acrylate used in the surface layer formation is not restricted and may be selected according to the intended purpose, as long as one or more (meth)acryloyl groups are included in one molecule. Examples include urethane (meth) acrylate, epoxy (meth)acrylate, polyester (meth)acrylate, and the like. One type of these may be used alone, or a combination of two or more types may be used.

Among these, urethane (meth)acrylate is preferable because of its degree of freedom in setting the toughness and hardness.

—Urethane (Meth)Acrylate—

The urethane (meth)acrylate is not restricted and may be selected according to the intended purpose, as long as one or more (meth)acryloyl groups ($CH_2$=CHCO— or $CH_2$=C($CH_3$)CO—) and one or more urethane bonds (—NHCOO—) are included in one molecule. Examples include polybutadiene-based urethane acrylate, carbonate-based urethane acrylate, ester-based urethane acrylate, ether-based urethane acrylate, and the like. One type of these may be used alone, or a combination of two or more types may be used.

Among these, hydrogenated polybutadiene-based urethane acrylate is preferable because of having resistance to water vapor transmittance and little environmental variation in resistance.

—Energy Ray Curable Resin—

The energy ray curable resin is not restricted and may be selected according to the intended purpose, as long as the energy ray curable resin is obtained by polymerizing (meth) acrylate that has a (meth)acryloyl group. Examples include an ultraviolet curable resin, electron beam curable resin, infrared curable resin, and the like. One type of these may be used alone, or a combination of two or more types may be used.

Among these, an ultraviolet ray curable resin is preferable because of its reaction speed and energy efficiency.

—Ultraviolet Ray Curable Resin—

The ultraviolet ray curable resin is not restricted and may be selected according to the intended purpose, as long as the ultraviolet ray curable resin is obtained by polymerizing (meth)acrylate that has a (meth)acryloyl group with ultraviolet light energy. Examples include a type using a radical photopolymerization initiator, a type using a cationic photopolymerization initiator, and the like. One type of these may be used alone, or a combination of two or more types may be used.

Among these, a radical photopolymerization initiator is preferable because of having a high reaction speed and few unhardened impurities.

<<Other Components>>

Other components included as necessary in the surface layer are not restricted and may be appropriately selected according to the intended purpose. Examples include a photopolymerization initiator, photopolymerization initiator auxiliary agent, microparticles, foam stabilizer, ion conductive agent, filler, peptizer, foaming agent, plasticizer, softener, tackifier, anti-blocking agent, separating agent, mold release agent, extender, colorant, crosslinking agent, vulcanizing agent, polymerization inhibitor, and the like. One type of these may be used alone, or a combination of two or more types may be used.

—Microparticles—

The material of the microparticles is not restricted and may be selected according to the intended purpose. Examples include silicone rubber, acrylic resin, styrene resin, acrylic/styrene copolymer, fluorine resin, urethane elastomer, urethane acrylate, melamine resin, phenol resin, and the like. One type of these may be used alone, or a combination of two or more types may be used.

Among these, urethane elastomer is preferable because of its flexibility and its adhesion to resin.

<Other Layers>

The laminated body of this disclosure may include other layers as necessary.

The other layers are not restricted and may be appropriately selected according to the intended purpose. Examples include a substrate layer and a metal adhesive layer. One type of these may be used alone, or a combination of two or more types may be used.

The laminated body of this disclosure has improved adhesive force between the base layer and the surface layer by the (meth)acryloyl group in the base layer and the (meth)acryloyl group in the surface layer bonding by covalent bonding. Specifically, the laminated body has improved adhesive force between the base layer and surface layer as a result of a mechanism whereby the (meth)acryloyl groups trigger radical polymerization between the base layer and surface layer. Furthermore, a conductive roller including the laminated body of this disclosure with improved adhesive force between the base layer and the surface layer has improved adhesion durability, thereby having improved durability with respect to friction stress due to the higher speeds of recent printers and contributing to a longer life of the conductive roller.

(Method for Manufacturing a Laminated Body)

A method for manufacturing according to this disclosure is a method for manufacturing the above-described laminated body and at least includes a base layer formation process, an application process, and an ultraviolet light irradiation process. The method for manufacturing also includes other processes as necessary.

<Base Layer Formation Process>

The base layer formation process is a process for forming a base layer including polyurethane having a (meth)acryloyl group.

The base layer is as described above.

The method of forming the base layer is not restricted and may be appropriately selected according to the intended purpose. Examples include formation by thermal curing, formation by optical curing, formation by electron beam curing, and the like. One type of these may be used alone, or a combination of two or more types may be used.

Among these, formation by optical curing is preferable in terms of energy efficiency and of simplifying the manufacturing facility.

<Application Process>

The application process is a process for applying a composition including (meth)acrylate onto the base layer that was formed in the base layer formation process.

The composition is a composition that includes the (meth) acrylate used in the above-described surface layer formation and includes a solvent and the like as necessary.

<<Solvent>>

The solvent is not restricted and may be appropriately selected according to the intended purpose. Examples include alcohols such as methanol, ethanol, and isopropyl alcohol; butyl acetate; dimethyl sulfone; dimethyl sulfoxide; tetrahydrofuran; dioxane; toluene; xylene; and the like. One type of these may be used alone, or a combination of two or more types may be used.

Among these, butyl acetate is preferable in terms of volition rate.

The method of application is not restricted and may be appropriately selected according to the intended purpose. Examples include spraying, roll coating, dipping, die coating, and the like. One type of these may be used alone, or a combination of two or more types may be used.

Among these, roll coating is preferable in terms of uniformity of the coating.

<Ultraviolet Light Irradiation Process>

The ultraviolet light irradiation process is a process for irradiating ultraviolet light onto the composition applied in the application process.

The light source used in the ultraviolet light irradiation is not restricted and may be appropriately selected according to the intended purpose. Examples include a mercury lamp, a high-pressure mercury lamp, an ultra-high-pressure mercury lamp, a metal halide lamp, a xenon lamp, and the like.

The conditions for the ultraviolet light irradiation are not restricted, and the irradiation intensity, cumulative light amount, and the like may be appropriately selected in accordance with factors such as the components included in the ultraviolet curable resin, the composition of the ultraviolet curable resin, and the application amount of the ultraviolet curable resin.

<Other Processes>

The other processes are not restricted and may be appropriately selected according to the intended purpose. Examples include a substrate layer cleaning process. One type of process may be used alone, or a combination of two or more types may be used.

(Conductive Roller)

The conductive roller according to this disclosure includes at least a shaft and the above-described laminated body formed on the shaft. The conductive roller according to this disclosure can be manufactured with a known method.

Figure 2:
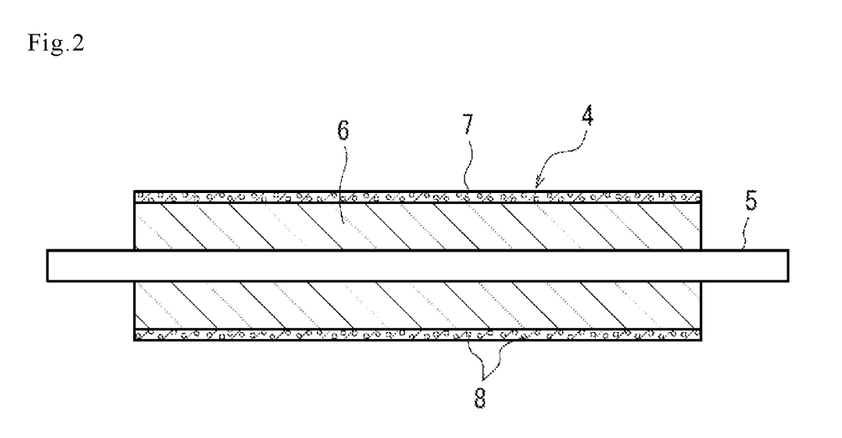
FIG. 2 is a partial cross-sectional diagram of an example of a conductive roller according to this disclosure.

FIG. 2 is a cross-sectional diagram of an example of a conductive roller according to this disclosure. A conductive roller 4 illustrated in FIG. 2 includes a shaft 5 that is attached by being axially supported at both ends in the length direction and an elastic layer 6 (corresponding to the base layer of the laminated body according to this disclosure) disposed on the radial outer side of the shaft 5. The conductive roller 4 illustrated in FIG. 2 includes only one elastic layer 6, but two or more elastic layers may be included. The conductive roller 4 illustrated in FIG. 2 also includes a surface layer 7 (corresponding to the surface layer of the laminated body according to this disclosure) on the radial outer side of the elastic layer 6. In the conductive roller 4 illustrated in FIG. 2, the surface layer 7 includes microparticles 8, but inclusion of the microparticles is not essential. Furthermore, the conductive roller 4 illustrated in FIG. 2 includes only one surface layer 7, but two or more surface layers may be included.

The type of conductive roller according to this disclosure is not restricted and may be appropriately selected according to the intended purpose. Examples include a charging roller, toner supply roller, development roller, transfer roller, cleaning roller, fixing roller, and the like.

Among these, a charging roller and a development roller require an adhesive force with respect to the coating and thus require the effect of this disclosure.

<Shaft>

The shaft is not restricted and may be appropriately selected according to the intended purpose. Examples include a hollow cylindrical body, a solid cylinder, or the like that is made of metal or resin. One type may be used alone, or a combination of two or more types may be used.

EXAMPLES

Further details are now provided with Examples. This disclosure, however, is not restricted by these Examples by any means and can be modified in an appropriate manner without departing from the scope and spirit thereof.

Laminated bodies were produced by the following method.

Examples 1 to 31 and Comparative Examples 1 to 7

<Preparation of Mixture for Base Layer Production>

The following were injected in a container: 20 grams of Sannix FA-951 (manufactured by Sanyo Chemical Industries, Ltd.) as a polyol, 50 grams of Kuraray polyol F-510 (manufactured by Kuraray Co., Ltd.) as a polyol, 20 grams of Kuraray polyol F-1010 (manufactured by Kuraray Co., Ltd.) as a polyol, a predetermined amount of prepolymerized TDI (manufactured by Asahi Glass Co., Ltd.) as an isocyanate (isocyanate group %=7%), a predetermined amount of a (meth)acrylate containing a hydroxyl group as listed in Tables 1 to 4 as a (meth)acrylate, a predetermined amount of a (meth)acrylate containing an isocyanate group as listed in Tables 1 to 4 as a (meth)acrylate, 0.1 grams of Neostann U-100 (manufactured by Nitto Kasei Co., Ltd.) as a catalyst, and a predetermined amount of SF-2937F (manufactured by Dow Corning Toray Co., Ltd.) as listed in Tables 1 to 4 as a foam stabilizer. The prepolymerized TDI as an isocyanate was used in the blending to set the index ratio (number of moles of isocyanate group/number of moles of hydroxyl group) to 1.1.

The blending ratio listed in Tables 1 to 4 below indicates the blending ratio when the total parts by mass (the total parts by mass of "polyol and isocyanate" in Tables 1 to 4) of each type of polyol (Sannix FA-951, Kuraray polyol F-510, and Kuraray polyol F-1010) and the isocyanate (prepolymerized TDI) is 100 parts by mass.

<Base Layer Production>

Using a dispersing mixer, the mixture for base layer production was mixed at 2000 rpm for 5 minutes. The mixture for base layer production was poured into a 200 mm×200 mm×2 mm mold, the inner surface of which was coated with fluorine. The mixture was heated for 30 minutes at 120° C. using an oven, and the hardened urethane base layer was then extracted from the mold.

<Preparation of Mixture for Surface Layer Formation>

Urethane acrylate, a surface modifier, a photocatalyst, and a solvent were blended at the ratios listed in Tables 1 to 3 and mixed using a dispersing mixer at 2000 rpm for 5 minutes to yield mixtures for surface layer formation (Examples 1 to 31, Comparative Examples 1, 2).

A curing agent and a polyol were also blended at the ratios listed in Table 4 and mixed using a pneumatic stirring blade at 200 rpm for 10 min to yield mixtures for surface layer formation (Comparative Examples 3 to 7).

The hydrogenated polybutadiene-based urethane acrylate used as the urethane acrylate was prepared by the following method.

<<Preparation of Hydrogenated Polybutadiene-Based Urethane Acrylate>>

Two hundred grams of a hydrogenated polybutadiene containing a hydroxyl group (GI-1000, manufactured by Nippon Soda Co., Ltd.) as a polyol and 73 grams of isophorone diisocyanate (IPDI) (VESTANAT IPDI, manufactured by Evonik Degussa Japan, Co., Ltd.) were injected into a three-neck flask and mixed. While stirring this mixture at 100 rpm, 0.01% of dibutyltin dilaurate was added to the mixture with respect to the total parts by mass of the polybutadiene containing a hydroxyl group as a polyol and the isophorone diisocyanate. The mixture was then heated for two hours at a liquid temperature of 70° C. using a heating mantle. After heating, disappearance of the polyol was confirmed with a hydroxyl value method. Next, 34.1 grams of 2-hydroxyethyl acrylate (2-HEA) (manufactured by Kyoeisha Chemical Co., Ltd.) was measured in a balance, dripped into a three-neck flask, and then heated for 2 hours at a liquid temperature of 70° C. using a heating mantle. After heating, the disappearance of isocyanate was confirmed by Fourier transform infrared spectroscopy (FT-IR), and the reaction was stopped.

<Surface Layer Formation>

In Examples 1 to 31 and Comparative Examples 1 and 2, a 0.1 mm thick metal spacer was attached to the base layer obtained with the above method, and the mixture for surface layer formation was poured on. The upper portion of the mixture for surface layer formation was then covered with a polyethylene terephthalate film (PET film) and 5 mm thick Pyrex® (Pyrex is a registered trademark in Japan, other countries, or both) glass. A D-bulb of a 6-inch UV lamp-conveyer system (manufactured by Fusion UV, Co., Ltd.) was then used to irradiate ultraviolet light, thereby hardening the mixture for surface layer formation to obtain the laminated body. The conveyer speed was 2 cm/sec. The peak intensity of the radiated ultraviolet light (365 nm) was 1584 mW/cm, and the cumulative light amount was 1086 mJ/cm$^2$.

In Comparative Examples 3 to 7, a 0.1 mm thick metal spacer was attached to the produced base layer, and the mixture for surface layer formation, which was curable urethane paint, was poured on. The result was dried in an oven at 105° C. for one hour to form the surface layer.

The adhesive force between the base layer and the surface layer of the resulting laminated body was assessed by the following cross-cut test and peel test. The results are as shown in Tables 1 to 4.

<Cross-Cut Test>

Twenty-five squares measuring 2 mm×2 mm wide in 5 columns and 5 rows were cut into the resulting laminated bodies. Tape No. 29, manufactured by Nitto Denko Corporation, was pressed firmly onto the laminated bodies with a finger and quickly peeled off. Any square that even partially peeled was deemed to have peeled, and the number of squares that did not peel were counted. A laminated body for which no squares peeled was "25/25". A larger number indicates a higher adhesive force, and a laminated body rated 25/25 can be suitably applied to a development roller.

<Peel Test>

The obtained laminated bodies were cut into 1 mm wide pieces using a punching blade and were further cut by a utility knife between the surface layer and the base layer. Using an EZ-TEST (manufactured by Shimadzu Corporation), the adhesive force between the base layer and the surface layer of the cut laminated bodies was measured using a 180° separation technique. At a separation rate of 10 mm/min, the test force listed in Tables 1 to 4 is the average of the peak test force for five test pieces. A larger numerical value indicates a higher adhesive force, and a value of 2 N or greater is suitable for guaranteeing the durability of the conductive roller.

TABLE 1

| | Compound | Product name | Comparative Example 1 | Comparative Example 2 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|---|
| Base layer | polyol and isocyanate | | 100 | 100 | 100 | 100 | 100 | 100 | 100 | 100 | 100 | 100 | 100 | 100 | 100 |
| | (meth)acrylate containing a hydroxyl group | LIGHT ESTER HO-A *1 | | | 1 | 2 | 4 | | | | | | | | |
| | | LIGHT ACRYLATE HOP-A *2 | | | | | | 6 | | | | | | | |
| | | LIGHT ESTER HO-250 *3 | | | | | | | 6 | | | | | | |
| | | 4-HBA *4 | | | | | | | | 6 | | | | | |
| | | M-306 *5 | | | | | | | | | 6 | | | | |
| | | M-215 *6 | | | | | | | | | | 6 | | | |
| | | M-403 *7 | | | | | | | | | | | 6 | | |
| | | CHDMMA *8 | | | | | | | | | | | | 6 | |
| | | Viscoat #540 *9 | | | | | | | | | | | | | 6 |
| | (meth)acrylate containing an isocyanate group | HEAA *10 | | | | | | | | | | | | | |
| | | Karenz AOI *11 | | | | | | | | | | | | | |
| | | Karenz MOI *12 | | | | | | | | | | | | | |
| | | Karenz BEI *13 | | | | | | | | | | | | | |
| | foam stabilizer | SF-2937F *14 | 4 | | 4 | 4 | 4 | 4 | 4 | 4 | 4 | 4 | 4 | 4 | 4 |

TABLE 1-continued

| | Compound | Product name | Comparative Example 1 | Comparative Example 2 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|---|
| Surface layer | hydrogenated polybutadiene-based urethane acrylate | PCA004 *15 | 100 | 100 | 100 | 100 | 100 | 100 | 100 | 100 | 100 | 100 | 100 | 100 | 100 |
| | carbonate-based urethane acrylate | UV-3000B *16 | | | | | | | | | | | | | |
| | ester-based urethane acrylate | UV-3700B *17 | | | | | | | | | | | | | |
| | ether-based urethane acrylate | 14EG-A *18 | | | | | | | | | | | | | |
| | polypropylene glycol diacrylate | | | | | | | | | | | | | | |
| | epoxy diacrylate | Epolight 3002A *19 | | | | | | | | | | | | | |
| | surface modifier (silicone, fluorine acrylate) | X-22-2457 *20 ByK-UV3500 *21 Megaface RS-72K *22 | 1 | 1 | 1 | 1 | 1 | 1 | 1 | 1 | 1 | 1 | 1 | 1 | 1 |
| | photocatalyst | IRGACURE 184 *23 | 50 | 50 | 50 | 50 | 50 | 50 | 50 | 50 | 50 | 50 | 50 | 50 | 50 |
| | solvent | butyl acetate *24 | | | | | | | | | | | | | |
| Adhesive force assessment | cross-cut test | | 3/25 | 10/25 | 20/25 | 25/25 | 25/25 | 25/25 | 25/25 | 25/25 | 25/25 | 25/25 | 25/25 | 25/25 | 25/25 |
| | peel test (N) | | 1.1 | 1.5 | 2.2 | 3.5 | 6.5 | 8.2 | 8.1 | 8.8 | 8.2 | 6.8 | 7.1 | 6.8 | 6.8 |

TABLE 2

| Compound | | Product name | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| Base layer | polyol and isocyanate | | 100 | 100 | 100 | 100 | 100 | 100 | 100 | 100 | 100 | 100 | 100 |
| | (meth)acrylate containing a hydroxyl group | LIGHT ESTER HO-A *1 | | | | | | | | | | | |
| | | LIGHT ACRYLATE HOP-A *2 | | | | | | | | | | | |
| | | LIGHT ESTER HO-250 *3 | | | | | | | | | | | |
| | | 4-HBA *4 | | | | | | | | | | | |
| | | M-306 *5 | | | | | | | | | | | |
| | | M-215 *6 | | | | | | | | | | | |
| | | M-403 *7 | | | | | | | | | | | |
| | | CHDMMA *8 | | | | | | | | | | | |
| | | Viscoat #540 *9 | 6 | 10 | 20 | | | | | | | | |
| | | HEAA *10 | | | | 6 | | | | | | | |
| | (meth)acrylate containing an isocyanate group | Karenz AOI *11 | | | | | 1 | 2 | 4 | 6 | 10 | | |
| | | Karenz MOI *12 | | | | | | | | | | 6 | |
| | | Karenz BEI *13 | | | | | | | | | | | 6 |
| | foam stabilizer | SF-2937F *14 | 4 | 4 | 4 | 4 | 4 | 4 | 4 | 4 | 4 | 4 | 4 |
| Surface layer | hydrogenated polybutadiene-based urethane acrylate | | 100 | 100 | 100 | 100 | 100 | 100 | 100 | 100 | 100 | 100 | 100 |
| | carbonate-based urethane acrylate | PCA004 *15 | | | | | | | | | | | |
| | ester-based urethane acrylate | UV-3000B *16 | | | | | | | | | | | |
| | ether-based urethane acrylate | UV-3700B *17 | | | | | | | | | | | |
| | polypropylene glycol diacrylate | 14EG-A *18 | | | | | | | | | | | |
| | epoxy diacrylate | Epolight 3002A *19 | | | | | | | | | | | |
| | surface modifier (silicone, fluorine acrylate) | X-22-2457 *20 | | | | | | | | | | | |
| | | BYK-UV3500 *21 | | | | | | | | | | | |
| | | Megaface RS-72K *22 | | | | | | | | | | | |
| | photocatalyst | IRGACURE 184 *23 | 1 | 1 | 1 | 1 | 1 | 1 | 1 | 1 | 1 | 1 | 1 |
| | solvent | butyl acetate *24 | 50 | 50 | 50 | 50 | 50 | 50 | 50 | 50 | 50 | 50 | 50 |
| Adhesive force assessment | cross-cut test | | 25/25 | 25/25 | 25/25 | 25/25 | 21/25 | 25/25 | 25/25 | 25/25 | 25/25 | 25/25 | 25/25 |
| | peel test (N) | | 6.2 | 6.4 | 7.2 | 8.5 | 2.2 | 3.9 | 6.8 | 7.2 | 7.2 | 7.3 | 7.1 |

TABLE 3

| Compound | | Product name | Example 23 | Example 24 | Example 25 | Example 26 | Example 27 | Example 28 | Example 29 | Example 30 | Example 31 |
|---|---|---|---|---|---|---|---|---|---|---|---|
| Base layer | polyol and isocyanate | | 100 | 100 | 100 | 100 | 100 | 100 | 100 | 100 | 100 |
| | (meth)acrylate containing a hydroxyl group | LIGHT ESTER HO-A *1 | 6 | 6 | 6 | 6 | 6 | 6 | 6 | 6 | 6 |
| | | LIGHT ACRYLATE HOP-A *2 | | | | | | | | | |
| | | LIGHT ESTER HO-250 *3 | | | | | | | | | |
| | | 4-HBA *4 | | | | | | | | | |
| | | M-306 *5 | | | | | | | | | |
| | | M-215 *6 | | | | | | | | | |
| | | M-403 *7 | | | | | | | | | |

TABLE 3-continued

| | Compound | Product name | Example 23 | Example 24 | Example 25 | Example 26 | Example 27 | Example 28 | Example 29 | Example 30 | Example 31 |
|---|---|---|---|---|---|---|---|---|---|---|---|
| | | CHDMMA *8 | | | | | | | | | |
| | | Viscoat #540 *9 | | | | | | | | | |
| | | HEAA *10 | | | | | | | | | |
| | (meth)acrylate containing an isocyanate group | Karenz AOI *11 | | | | | | | | | |
| | | Karenz MOI *12 | | | | | | | | | |
| | | Karenz BEI *13 | | | | | | | | | |
| | foam stabilizer | SF-2937F *14 | | 4 | 4 | 4 | 4 | 4 | 4 | 4 | 4 |
| Surface layer | hydrogenated polybutadiene-based urethane acrylate | | 100 | | | | 95 | 95 | 95 | | |
| | carbonate-based urethane acrylate | PCA004 *15 | | 100 | | | | | | | |
| | ester-based urethane acrylate | UV-3000B *16 | | | 100 | | | | | | |
| | ether-based urethane acrylate | UV-3700B *17 | | | | 100 | | | | | |
| | polypropylene glycol diacrylate | 14EG-A *18 | | | | | | | | 100 | |
| | epoxy diacrylate | Epolight 3002A *19 | | | | | | | | | 100 |
| | surface modifier (silicone, fluorine acrylate) | X-22-2457 *20 | | | | | 5 | | | | |
| | | BYK-UV3500 *21 | | | | | | 5 | | | |
| | | Megaface RS-72K *22 | | | | | | | 5 | | |
| | photocatalyst | IRGACURE 184 *23 | 1 | 1 | 1 | 1 | 1 | 1 | 1 | 1 | 1 |
| | solvent | butyl acetate *24 | 50 | 50 | 50 | 50 | 50 | 50 | 50 | 50 | 50 |
| Adhesive force assessment | cross-cut test | | 25/25 | 25/25 | 25/25 | 25/25 | 25/25 | 25/25 | 25/25 | 25/25 | 25/25 |
| | peel test (N) | | 8.5 | 8.2 | 8.2 | 8.3 | 5.5 | 4 | 7.2 | 7.4 | 7.5 |

TABLE 4

| | Compound | Product name | Comparative Example 3 | Comparative Example 4 | Comparative Example 5 | Comparative Example 6 | Comparative Example 7 |
|---|---|---|---|---|---|---|---|
| Base layer | polyol and isocyanate | | 100 | 100 | 100 | 100 | 100 |
| | (meth)acrylate containing a hydroxyl group | LIGHT ESTER HO-A *1 | 6 | 6 | 6 | 6 | 6 |
| | | LIGHT ACRYLATE HOP-A *2 | | | | | |
| | | LIGHT ESTER HO-250 *3 | | | | | |
| | | 4-HBA *4 | | | | | |
| | | M-306 *5 | | | | | |
| | | M-215 *6 | | | | | |
| | | M-403 *7 | | | | | |
| | | CHDMMA *8 | | | | | |
| | | Viscoat #540 *9 | | | | | |
| | | HEAA *10 | | | | | |
| | (meth)acrylate containing an isocyanate group | Karenz AOI *11 | | | | | |
| | | Karenz MOI *12 | | | | | |
| | | Karenz BEI *13 | | | | | |
| | foam stabilizer | SF-2937F *14 | 4 | 4 | 4 | 4 | 4 |

TABLE 4-continued

| | Compound | Product name | Comparative Example 3 | Comparative Example 4 | Comparative Example 5 | Comparative Example 6 | Comparative Example 7 |
|---|---|---|---|---|---|---|---|
| Surface layer | curing agent (isocyanate) | Takenate D140N *25 | 100 | 100 | 100 | 100 | |
| | | Coronate HX *26 | | | | | 100 |
| | polyol | Kuraray polyol F-3010 *27 | 390 | | | 390 | 780 |
| | | Sannix FA-921 *28 | | 480 | | | |
| | | Sannix GP-3000 *29 | | | 240 | | |
| | surface modifier | X-22-170DX *30 | 5 | 5 | 5 | | 5 |
| | solvent | MEK | 500 | 410 | 650 | 500 | 380 |
| Adhesive force assessment | cross-cut test | | 20/25 | 12/25 | 6/25 | 22/25 | 8/25 |
| | peel test (N) | | 1.8 | 1.1 | 0.6 | 1.8 | 0.8 |

Notes:
*1: LIGHT ESTER HO-A: 2-hydroxyethyl acrylate (manufactured by Kyoeisha Chemical Co., Ltd.)
*2: LIGHT ACRYLATE HOP-A: 2-hydroxypropyl acrylate (manufactured by Kyoeisha Chemical Co., Ltd.)
*3: LIGHT ESTER HO-250: 2-hydroxyethyl methacrylate (manufactured by Kyoeisha Chemical Co., Ltd.)
*4: 4-HBA: 4-hydroxybutyl acrylate (manufactured by Osaka Organic Chemical Industry, Ltd.)
*5: M-306: pentaerythritol and tetraacrylate (manufactured by Toagosei Co., Ltd.) (tri (%) 65 to 70)
*6: M-215: isocyanuric acid EO modified diacrylate (manufactured by Toagosei Co., Ltd.)
*7: M-403: dipentaerythritol penta and hexaacrylate (manufactured by Toagosei Co., Ltd.) (penta (%) 50 to 60)
*8: CHDMMA: 1,4-cyclohexane dimethanol monoacrylate (manufactured by Nippon Kasei Chemical Co., Ltd.)
*9: Viscoat #540: adduct of bisphenol A diglycidyl ether acrylic acid (manufactured by Osaka Organic Chemical Industry, Ltd.)
*10: HEAA: hydroxyethyl acrylamide (manufactured by Kohjin Co., Ltd.)
*11: Karenz AOI: 2-isocyanatoethyl acrylate (manufactured by Showa Denko K.K.)
*12: Karenz MOI: 2-isocyanatoethyl methacrylate (manufactured by Showa Denko K.K.)
*13: Karenz BEI: 1,1-(bisacryloyl oxymethyl)ethyl isocyanate (manufactured by Showa Denko K.K.)
*14: SF-2937F: silicone for rigid foam (manufactured by Dow Corning Toray Co., Ltd.)
*15: PCA004: polycarbonate-based urethane acrylate (manufactured by Asia Industry Co., Ltd.)
*16: UV-3000B: polyester-based urethane acrylate (The Nippon Synthetic Chemical Industry Co., Ltd.)
*17: UV-3700B: ether-based urethane acrylate (The Nippon Synthetic Chemical Industry Co., Ltd.)
*18: 14EG-A: polypropylene glycol diacrylate (manufactured by Kyoeisha Chemical Co., Ltd.)
*19: Epolight 3002A: epoxy diacrylate (manufactured by Kyoeisha Chemical Co., Ltd.)
*20: X-22-2457: side chain-type acrylic modification silicone (manufactured by Shin-Etsu Chemical Co., Ltd.)
*21: BYK-UV3500: polyether modified polydimethylsiloxane having an acrylic group (manufactured by BYK-Chemie)
*22: Megaface RS-72K: fluorine acrylate (manufactured by DIC Corporation)
*23: IRGACURE 184: 1-hydroxy-cyclohexyl-phenyl-ketone (manufactured by BASF Japan)
*24: butyl acetate (manufactured by Daicel Corporation)
*25: Takenate D140N: trimethylolpropane adduct of isophorone diisocyanate (manufactured by Mitsui Chemicals Co., Ltd.)
*26: Coronate HX: isocyanurate of hexamethylene diisocyanate (Nippon Polyurethane Industry Co., Ltd.)
*27: Kuraray polyol F-3010: trifunctional polyester polyol (Kuraray Co., Ltd.)
*28: Sannix FA-921: propylene oxide adduct of trifunctional glycerine (manufactured by Sanyo Chemical Industries, Ltd.)
*29: Sannix GP-3000: propylene oxide adduct of trifunctional glycerine (manufactured by Sanyo Chemical Industries, Ltd.)
*30: X-22-170DX: silicone for curable urethane (manufactured by Shin-Etsu Chemical Co., Ltd.)

From Tables 1 to 4, it is clear that the laminated body of the Examples (Examples 1 to 15 and 23 to 31) that were obtained by compounding (meth)acrylate having a hydroxyl group into the mixture for base layer production in the polyurethane having a (meth)acryloyl group and the laminated body of the Examples (Examples 16 to 22) that were obtained by compounding (meth)acrylate having an isocyanate group into the mixture for base layer production in the polyurethane having a (meth)acryloyl group had a better adhesive force than the laminated body of Comparative Examples 1 and 2 that were obtained without compounding (meth)acrylate into the mixture for base layer production.

As shown in Tables 1 to 4, the laminated body of the Examples (Examples 2 to 15 and 17 to 31) in which the compounding amount of the (meth)acrylate in the mixture for base layer production was two parts by mass or more had a higher adhesive force than the laminated body of the Examples (Comparative Examples 1 and 16) in which the compounding amount of the (meth)acrylate was less than two parts by mass. It is thus clear that setting the compounding amount of the (meth)acrylate in the mixture for base layer production to be two parts by mass or greater significantly improves the adhesive force of the laminated body.

INDUSTRIAL APPLICABILITY

The laminated body of this disclosure can, for example, be suitably used in a charging roller, toner supply roller, development roller, transfer roller, cleaning roller, fixing roller, and the like.

REFERENCE SIGNS LIST

1 Laminated body
2 Base layer
3 Surface layer
4 Conductive roller
5 Shaft
6 Elastic layer
7 Surface layer
8 Microparticles

The invention claimed is:

1. A laminated body comprising a base layer and a surface layer formed on the base layer; wherein
    the base layer includes a polyurethane having a (meth)acryloyl group, the base layer being formed by thermal curing;
    the surface layer includes an ultraviolet curable resin obtained by polymerizing a (meth)acrylate that has a (meth)acryloyl group;
    the laminated body is formed by the (meth)acryloyl group in the polyurethane reacting with the (meth)acryloyl group in the (meth)acrylate;
    the polyurethane is obtained by reacting a polyol, a prepolymerized tolylene diisocyanate, and a (meth)acrylate which is at least one selected from the group consisting of 2-hydroxyethyl acrylate, 2-hydroxypropyl acrylate, 2-hydroxyethyl methacrylate, 4-hydroxybutyl acrylate, and hydroxyethyl acrylamide; and
    the compounding amount of the (meth)acrylate is from 2 parts by mass to 20 parts by mass relative to a total of 100 parts by mass of the polyol and the prepolymerized tolylene diisocyanate.

2. The laminated body of claim 1, wherein the compounding amount of the (meth)acrylate is from 2 parts by mass to 10 parts by mass relative to a total of 100 parts by mass of the polyol and the prepolymerized tolylene diisocyanate.

3. The laminated body of claim 1, wherein the compounding amount of the (meth)acrylate is from 2 parts by mass to 6 parts by mass relative to a total of 100 parts by mass of the polyol and the prepolymerized tolylene diisocyanate.

4. The laminated body of claim 1, wherein the compounding amount of the (meth)acrylate is from 4 parts by mass to 20 parts by mass relative to a total of 100 parts by mass of the polyol and the prepolymerized tolylene diisocyanate.

5. The laminated body of claim 1, wherein the compounding amount of the (meth)acrylate is from 4 parts by mass to 10 parts by mass relative to a total of 100 parts by mass of the polyol and the prepolymerized tolylene diisocyanate.

6. The laminated body of claim 1, wherein the compounding amount of the (meth)acrylate is from 4 parts by mass to 6 parts by mass relative to a total of 100 parts by mass of the polyol and the prepolymerized tolylene diisocyanate.

7. A conductive roller comprising the laminated body of claim 1.

8. A method for manufacturing the laminated body of claim 1, the method comprising:
    forming a base layer including polyurethane having a (meth)acryloyl group;
    applying a composition including (meth)acrylate onto the base layer that was formed; and
    irradiating the applied composition with ultraviolet light to form a surface layer that includes a polymer of the (meth)acrylate and to react the (meth)acryloyl group in the (meth)acrylate with the (meth)acryloyl group in the polyurethane,
    wherein the polyurethane is obtained by reacting polyol, prepolymerized tolylene diisocyanate, and (meth)acrylate which is at least one selected from the group consisting of 2-hydroxyethyl acrylate, 2-hydroxypropyl acrylate, 2-hydroxyethyl methacrylate, 4-hydroxybutyl acrylate, and hydroxyethyl acrylamide.

* * * * *